United States Patent
Hayashikawa et al.

(10) Patent No.: US 8,811,446 B2
(45) Date of Patent: Aug. 19, 2014

(54) GAS LASER OSCILLATOR APPARATUS AND LASER GAS REPLACEMENT METHOD

(71) Applicant: Panasonic Corporation, Osaka (JP)

(72) Inventors: Hiroyuki Hayashikawa, Osaka (JP); Hitoshi Hongu, Hyogo (JP); Takayuki Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/981,312

(22) PCT Filed: Jan. 17, 2013

(86) PCT No.: PCT/JP2013/000178
§ 371 (c)(1),
(2), (4) Date: Jul. 23, 2013

(87) PCT Pub. No.: WO2013/136644
PCT Pub. Date: Sep. 19, 2013

(65) Prior Publication Data
US 2014/0105237 A1   Apr. 17, 2014

(30) Foreign Application Priority Data
Mar. 12, 2012 (JP) ................. 2012-054154

(51) Int. Cl.
*H01S 3/22* (2006.01)
*H01S 3/036* (2006.01)
*H01S 3/07* (2006.01)
*H01S 3/041* (2006.01)

(52) U.S. Cl.
CPC ............. *H01S 3/036* (2013.01); *H01S 3/073* (2013.01); *H01S 3/041* (2013.01)
USPC .................. 372/55; 372/57; 372/58; 372/59; 372/61

(58) Field of Classification Search
CPC ............. H01S 3/02; H01S 3/027; H01S 3/03; H01S 3/032; H01S 3/034; H01S 3/036; H01S 3/038; H01S 3/0404; H01S 3/041; H01S 3/073
USPC ........................................ 372/55, 57, 58, 59
See application file for complete search history.

(56) References Cited

U.S. PATENT DOCUMENTS

| | | | |
|---|---|---|---|
| 5,642,374 A | 6/1997 | Wakabayashi et al. | |
| 6,414,979 B2 * | 7/2002 | Ujazdowski et al. | 372/87 |
| 2006/0049147 A1 * | 3/2006 | Hayashikawa et al. | 219/121.6 |
| 2006/0274806 A1 | 12/2006 | Sato et al. | |
| 2011/0290768 A1 * | 12/2011 | Hayashikawa et al. | 219/121.67 |

FOREIGN PATENT DOCUMENTS

| | | |
|---|---|---|
| JP | 4-80977 | 3/1992 |
| JP | 6-232481 | 8/1994 |

(Continued)

OTHER PUBLICATIONS

Japanese version of International Search Report of PCT/JP2013/000178, dated Feb. 26, 2013.

*Primary Examiner* — Dung Nguyen
(74) *Attorney, Agent, or Firm* — Panasonic Patent Center

(57) ABSTRACT

The gas laser oscillator apparatus of the present invention has laser gas sealed in a vacuum chamber under a decompressed condition lower than atmospheric pressure; a discharge means for exciting the laser gas; a blower means for blowing the laser gas; a laser-gas flow passage as a circulation passage of the laser gas between the discharge means and the blower means; and a gas compression means for discharging a predetermined amount of the laser gas from the laser-gas flow passage. The gas decompression means is structured on the application of Bernoulli's principle. The gas decompression means has a sequence for decreasing the ratio of air mixed into the laser gas below a predetermined level with use of a part of pressurized gas used in a laser processing machine or the gas laser oscillator apparatus.

12 Claims, 3 Drawing Sheets

(56) References Cited

FOREIGN PATENT DOCUMENTS

| JP | 7-335961 | 12/1995 |
| JP | 10-176700 | 6/1998 |
| JP | 11-54851 | 2/1999 |
| JP | 2003-110170 | 4/2003 |
| JP | 2006-339455 | 12/2006 |
| JP | 2009-290162 | 12/2009 |
| JP | 2010-202222 | 9/2010 |

* cited by examiner

FLOW of
LASER GAS

GAS LASER OSCILLATOR APPARATUS AND LASER GAS REPLACEMENT METHOD

CROSS-REFERENCE TO RELATED APPLICATIONS

The present application is a U.S. national phase application of PCT international application PCT/JP2013/000178 filed on Jan. 17, 2013, which claims priority to Japanese Patent Application No. 2012-054154 filed on Mar. 12, 2012, the contents of both of which are incorporated herein by reference.

BACKGROUND

1. Technical Field

The present invention relates to a gas laser oscillator apparatus mainly used for sheet-metal cutting and also relates to a laser gas replacement method used for the apparatus.

2. Background Art

A conventional laser oscillator apparatus is described with reference to FIG. 3. FIG. 3 shows a block diagram of a conventional gas laser oscillator apparatus.

The apparatus has gas piping path 903 for circulating laser gas and has blower 908 for circulating laser gas at a high speed. On gas piping path 903, the following components are disposed: supply-side electromagnetic valve 910 as a laser gas supply means for supplying laser gas; laser gas cylinder 930 disposed in the outside of the apparatus; usual discharge-side electromagnetic valve 912; rapid discharge-side electromagnetic valve 913; and discharge pump 914. In the structure above, usual discharge-side electromagnetic valve 912 is connected in series to flow restrictor 911. Flow restrictor 911 is the laser gas discharge means that discharges laser gas from gas piping path 903. A rotary pump, which is relatively inexpensive and has a simple structure, is generally employed for discharge pump 914.

In the structure above, discharge pump 914 of the laser gas discharge means for discharging laser gas from gas piping path 903 constantly works to supply gas piping path 903 with fresh laser gas at a predetermined ratio and to maintain the pressure in gas piping path 903 at a predetermined level. Under the condition, laser gas is supplied as follows. That is, usual discharge-side electromagnetic valve 912 connected in series with flow restrictor 911 is opened while rapid discharge-side electromagnetic valve 913 is closed. Opening and closing supply-side electromagnetic valve 910, which is disposed in the laser gas supply means that supplies laser gas while maintaining the pressure in gas piping path 903 at a predetermined level, allows laser gas cylinder 930 disposed outside the apparatus to supply fresh laser gas (see Patent Literature 1, for example).

The conventional gas laser oscillator apparatus described above, however, has the following problems.

To discharge laser gas, a vacuum pump has to keep operating during the operation of the apparatus. A rotary pump, which is generally employed for the vacuum pump, uses oil. This causes a back flow of oil mist from the discharge pump to the laser-gas flow passage. The back flow of oil mist can cause disturbance in discharge or mirror degradation in the gas laser oscillator apparatus and invite decreased laser output.

Such a low laser output causes instability in laser cutting and a poor cutting surface of a cutoff work, generating cutting failure. Preventing such a cutting failure caused by poor laser output due to the back flow of oil mist in the vacuum pump for discharging has been a pending problem.

Besides, the rotary pump is driven by a motor on electricity. The constant needs of power consumption have also been a problem in terms of energy saving.

The conventional art above discloses that the structure decreases oil mixed into the blower means by controlling the pressure of the laser-gas flow passage. However, with such a structure, preventing entry of oil mist into the rotary pump cannot be expected.

CITATION LIST

Patent Literature

[PTL1]
Japanese Unexamined Patent Application Publication No. 2003-110170

SUMMARY

The present invention provides a gas laser oscillator apparatus and a laser gas replacement method capable of preventing a vacuum pump from having a back flow of oil mist into the vacuum system, of saving energy, and of offering highly eco-friendly structure with long-term reliability.

The gas laser oscillator apparatus of the present invention has laser gas, a discharge section for exciting the laser gas, a blower section for blowing the laser gas, a laser-gas flow passage, and a gas decompression section. The laser gas is sealed in a vacuum chamber under a decompressed condition lower than atmospheric pressure. The laser-gas flow passage forms the circulation passage of laser gas between the discharge section and the blower section. The gas decompression section discharges an amount of the laser gas from the laser-gas flow passage. In the gas laser oscillator apparatus of the present invention, the gas decompression section discharges, with suction, the laser gas from the laser-gas flow passage on the application of Bernoulli's principle. Using a part of pressurized gas used in a laser processing machine or the gas laser oscillator apparatus, the gas decompression section decreases the ratio of air mixed into the laser gas below a predetermined level.

The structure above addresses the problem of a conventional vacuum pump, i.e., the back flow of oil mist into the vacuum system is prevented. Thus, the structure saves energy and offers a highly eco-friendly laser oscillator apparatus with long-term reliability.

The laser gas replacement method of the present invention is employed for the gas laser oscillator apparatus having laser gas, a discharge section for exciting the laser gas, a blower section for blowing the laser gas, a laser-gas flow passage, and a gas decompression section. The laser gas is sealed in a vacuum chamber under a decompressed condition lower than atmospheric pressure. The laser-gas flow passage forms the circulation passage of laser gas between the discharge section and the blower section. The gas decompression section discharges an amount of the laser gas from the laser-gas flow passage. The laser gas replacement method of the present invention is formed of the following steps:

a step in which the gas decompression section discharges, with suction, the laser gas from the laser-gas flow passage on the application of Bernoulli's principle; and a step in which the gas decompression section decreases the ratio of air mixed into the laser gas below a predetermined level by using a part of pressurized gas used in a laser processing machine or the gas laser oscillator apparatus.

With the method above, the back flow of oil mist into the vacuum system is prevented. This provides a laser gas replacement method of laser oscillator apparatus capable of saving energy and enhancing eco-friendly performance with long-term reliability.

DETAILED DESCRIPTION OF THE PREFERRED EMBODIMENTS

Figure 1:
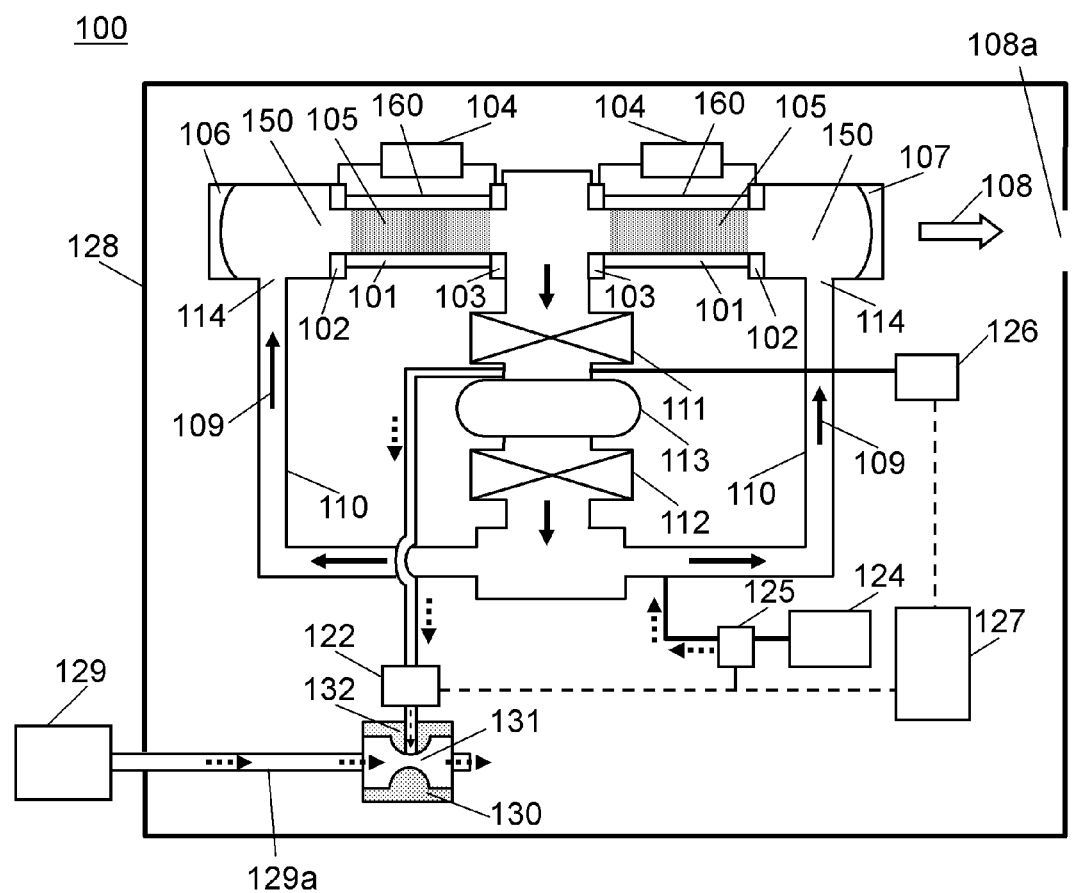
FIG. 1 is a block diagram of a gas laser oscillator apparatus in accordance with an exemplary embodiment of the present invention.

Hereinafter, an exemplary embodiment of the present invention will be described with reference to accompanying drawings. In the drawings below, like components have the same reference marks and the descriptions thereof may be omitted.

Exemplary Embodiment

FIG. 1 is a block diagram showing an example of the structure of an axial-type gas laser oscillator apparatus of the exemplary embodiment of the present invention. Hereinafter, gas laser oscillator apparatus 100 of the embodiment will be described with reference to FIG. 1.

Gas laser oscillator apparatus 100 of the embodiment has, as the main structure, discharge tube 101, electrodes 102 and 103, electric power supply 104, discharge space 105, total reflection mirror 106, and partial reflection mirror 107. Discharge tube 101 is made of a dielectric material such as glass. Electrodes 102 and 103 are disposed in the periphery of discharge tube 101. Electric power supply 104 is connected to electrodes 102 and 103. Discharge space 105 is formed in discharge tube 101 sandwiched between electrode 102 and electrode 103. Total reflection mirror 106 and partial reflection mirror 107, each of which is fixed to each end of discharge space 105, form an optical resonator for laser oscillation. Laser beam 108 is fed from partial reflection mirror 107.

Next, the main structure for laser gas circulation is described. Laser gas 150, as shown in FIG. 1, is sealed in gas laser oscillator apparatus 100 containing the optical resonator. Laser gas 150 circulates through axial-type gas laser oscillator apparatus 100. The structure has laser-gas flow passage 110 for circulation of the laser gas. Flowing direction 109 of laser gas 150 is shown by the arrows in FIG. 1.

In laser-gas flow passage 110, blower section 113 for circulating laser gas 150 and heat exchangers 111, 112 are disposed. Heat exchangers 111 and 112 decrease the temperature of laser gas 150 heated by discharge generated in discharge space 105 and by operation of a blower. Blower section 113 accelerates laser gas 150, by which laser gas 150 has a gas stream of approximately 100 m/sec in discharge space 105. Laser-gas flow passage 110 and discharge tube 101 are connected at laser-gas guiding section 114.

The space filled with laser gas 150 is maintained at pressures below atmospheric pressure during operation of gas laser oscillator apparatus 100, and is also maintained under a sealed condition so as to prevent entry of impurities other than laser gas 150 as possible. That is, the space to be filled with laser gas 150 is a vacuum chamber and then laser gas 150 is sealed therein.

However, laser gas 150 has time degradation due to dissociation caused by discharge. Laser gas 150 therefore needs to be discharged a degraded amount thereof and to be supplied a fresh amount thereof. Gas laser oscillator apparatus 100 of the embodiment has the structure capable of constantly discharging a predetermined amount of laser gas 150 and supplying a predetermined amount of laser gas 150 at the same time.

For discharging laser gas 150, gas decompression section 130 is disposed and a part of laser gas 150 is discharged from gas suction section 132 via piping connected with a part of laser-gas flow passage 110 and discharge valve 122. For supplying laser gas 150, laser-gas cylinder 124 is disposed and laser-gas flow passage 110 is supplied with a fresh amount of laser gas 150 by control of supply valve 125. Gas-pressure sensor 126 detects gas pressure in laser-gas flow passage 110. The apparatus contains control unit 127 for the control operation above.

The whole structure of gas laser oscillator apparatus 100 is accommodated in housing 128 and is separated from the ambient atmosphere. Housing 128 has basically no opening other than laser beam outlet 108a. Dry-air supply unit 129 constantly supplies the inside of housing 128 with a predetermined amount of dry air. In particular, as a distinctive feature of the present invention, the structure has piping so that dry air flows through gas flow passage 131 in gas decompression section 130.

The workings of gas laser oscillator apparatus 100 with the structure above will be described in detail.

After the startup of gas laser oscillator apparatus 100, laser-gas flow passage 110 is thoroughly filled with laser gas 150 at a predetermined pressure. Laser gas 150 sent by blower section 113 flows through laser-gas flow passage 110 and is guided into discharge tube 101 by laser-gas guiding section 114. Under the condition, discharge section 160 for exciting laser gas 150 generates discharge in discharge space 105 from electrodes 102, 103 that are connected to electric power supply 104. That is, discharge section 160 is formed of electric power supply 104, electrodes 102, 103, discharge tube 101, and discharge space 105. Laser gas 150 in discharge space 105 is excited by the discharge energy. Light fed from excited laser gas 150 comes and goes in the optical resonator formed of total reflection mirror 106 and partial reflection mirror 107, generating a resonant condition. Laser beam 108 is fed from partial reflection mirror 107 and is used for laser processing, for example.

Housing 128, which accommodates the whole structure of gas laser oscillator apparatus 100 and separates the apparatus from the ambient atmosphere, constantly receives a predetermined amount of dry air from dry-air supply unit 129 during operation.

Dry air has mainly two roles: one is to prevent entry of dust and the like from outside by increasing the gas pressure in housing 128; and the other one is to decrease humidity in housing 128. Preventing entry of dust and decreasing humidity are necessary for maintaining insulating performance of discharge section 160 accommodated in housing 128. The supplied dry air is discharged from the outlet for laser beam 108 to the outside and replaced with fresh air in a constant cycle.

Gas decompression section 130 discharges a predetermined amount of the gas from laser-gas flow passage 110 via discharge valve 122 during operation of gas laser oscillator apparatus 100. The discharge amount at that time ranges from 20 liters to 30 liters per hour. According to the amount of discharged gas, gas of laser-gas cylinder 124 is fed into laser-gas flow passage 110 by opening/closing of supply valve 125.

The pressure in laser-gas flow passage 110 is constantly monitored by gas-pressure sensor 126. Control unit 127 intermittently opens and closes supply valve 125 so that an average pressure is retained at a constant value.

Gas decompression section 130 discharges the laser gas 150, with suction at gas suction section 132, from laser-gas flow passage 110 on the application of Bernoulli's principle. For gas discharge on Bernoulli's principle, a means for causing pressure difference is needed. According to the embodiment, pressurized air fed from dry-air supply unit 129 is used as an example of the means.

Gas flow passage 131 is disposed in gas decompression section 130. Pressurized dry air is guided into gas flow passage 131 via piping 129a. Gas flow passage 131 has a narrow part at which the velocity of flow of dry air is increased. According to Bernoulli's principle, the narrow part of gas flow passage 131 is depressurized. Laser gas 150 is drawn into depressurized gas flow passage 131 by gas suction section 132 and then discharged into the outside together with dry air.

As described above, the structure of gas laser oscillator apparatus 100 of the embodiment has no use of oil, as will be understood, generating no back flow of oil mist into laser-gas flow passage 110. Therefore, the structure has no worry for stains on a mirror, generating stable discharge and providing consistently excellent laser cutting.

That is, gas laser oscillator apparatus 100 of the embodiment has laser gas 150, discharge section 160, blower section 113, laser-gas flow passage 110, and gas decompression section 130. Laser gas 150 is sealed in a vacuum chamber, e.g., in discharge tube 101, under a decompressed condition lower than atmospheric pressure. Discharge section 160 excites laser gas 150. Blower section 113 blows laser gas 150. Laser-gas flow passage 110 forms the circulation passage of laser gas 150 between discharge section 160 and blower section 113. Gas decompression section 130 discharges an amount of laser gas 150 from laser-gas flow passage 110. Gas decompression section 130 discharges, with suction, laser gas 150 from laser-gas flow passage 110 on the application of Bernoulli's principle. Using a part of pressurized gas used in a laser processing machine or gas laser oscillator apparatus 100, gas decompression section 130 decreases the ratio of air mixed into laser gas 150 below a predetermined level.

The structure above addresses the problem of a conventional vacuum pump, i.e., the back flow of oil mist into the vacuum system is prevented. Thus, the structure saves energy, offering a highly eco-friendly laser oscillator apparatus with long-term reliability.

Dry air is originally fed into housing 128 of gas laser oscillator apparatus 100 as purge gas. The dry air is used for preventing entry of dust into housing 128 from outside and maintaining the inside of housing 128 in a dried atmosphere. After used for gas decompression section 130, the dry air is employed for purge gas in housing 128 of gas laser oscillator apparatus 100.

That is, the structure may use dry air fed into housing 128 as pressurized gas. This provides the structure with an advantage—no need for additionally preparing pressurized gas. Utilizing dry air, which is generally used in a laser processing machine or gas laser oscillator apparatus 100, contributes to significant energy saving.

As another example of the pressurized gas used for gas decompression section 130, assist gas (not shown) used for laser processing also works with effect. Instead of the dry air described above, feeding an amount of assist gas into gas decompression section 130 allows the structure to eliminate a need for an additional power source for discharging. As for the assist gas, nitrogen gas generated by a nitrogen-gas generator is useful.

The pressurized gas may contain at least any one of nitrogen, oxygen, and air used as assist gas for laser processing. The structure eliminates a need for an additional power source for discharging, contributing to further energy saving.

When the present invention is applied, it is preferable that the structure contains a sequence for decreasing the ratio of air in laser gas. Gas decompression section 130 based on Bernoulli's principle is less powerful than a generally used rotary pump in terms of ultimate vacuum. It is therefore expected that, after laser-gas flow passage 110 has been filled with air by maintenance operation, the air is not easily replaced with laser gas 150. Employing a sequence that repeats discharging laser gas 150 from laser-gas flow passage 110 and refilling the passage with laser gas 150 a predetermined number of times is effective in addressing the aforementioned problem.

That is, the structure may contain the sequence that repeats discharging laser gas 150 from laser-gas flow passage 110 and refilling the passage with laser gas 150 a predetermined number of times. With the structure above, after laser-gas flow passage 110 has been filled with air, the air is easily replaced with laser gas 150. As an example of the sequence that repeats discharging laser gas from laser-gas flow passage 110 and refilling the passage with laser gas 150 a predetermined number of times, the following method is also effective. According to the method, replacement of laser gas 150 is encouraged by increasing a discharge amount of laser gas for a predetermined time after laser start-up.

The laser gas replacement method of the present invention is the laser gas replacement method employed for the gas laser oscillator apparatus 100 having the structure above. The method contains a step of discharging with suction and a step of decreasing the ratio of air below a predetermined level. In the step of discharging with suction, gas decompression section 130 discharges, with suction, laser gas 150 from laser-gas flow passage 110 on the application of Bernoulli's principle. In the step of decreasing the ratio of air below a predetermined level, gas decompression section 130 uses a part of pressurized gas used in a laser processing machine or gas laser oscillator apparatus 100 and decreases the ratio of air mixed into laser gas 150 below a predetermined level.

With the method above, the back flow of oil mist into the vacuum system is prevented. This provides the laser gas replacement method of the laser oscillator apparatus capable of saving energy and enhancing eco-friendly performance with long-term reliability.

In the method above, the dry air fed into housing 128 may be used as pressurized gas. This provides an advantage of no need for additionally preparing pressurized gas.

In addition, the pressurized gas may contain at least any one of nitrogen, oxygen, and air used as assist gas for laser processing. This eliminates a need for an additional power source for discharging, contributing to further energy saving.

Further, discharging laser gas from laser-gas flow passage 110 and refilling the passage with laser gas 150 may be repeated a predetermined number of times. With the method above, after laser-gas flow passage 110 has been filled with air, the air is easily replaced with laser gas 150.

Figure 2:
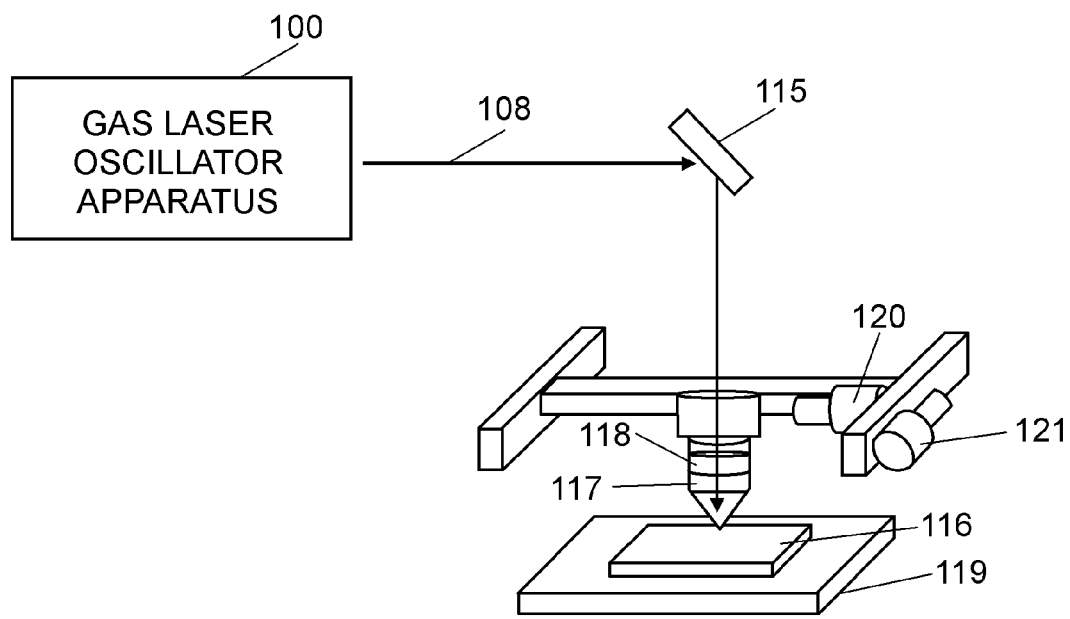
FIG. 2 is a block diagram of a laser processing machine for sheet-metal cutting that employs the gas laser oscillator apparatus of the exemplary embodiment of the present invention.
Figure 3:
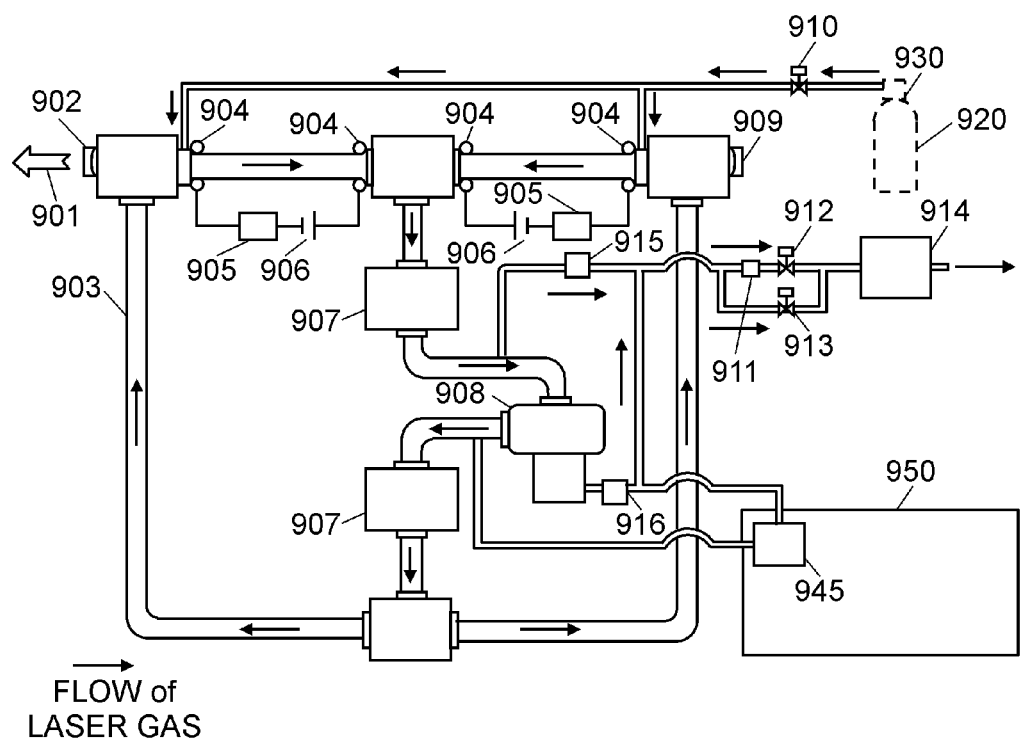
FIG. 3 is a block diagram of a conventional gas laser oscillator apparatus.

Next, a general structure of a sheet-metal-cutting laser processing machine containing gas laser oscillator apparatus 100 of the embodiment will be described. FIG. 2 is a block diagram showing an example of a sheet-metal-cutting laser processing machine containing gas laser oscillator apparatus 100 of the embodiment.

As shown in the structure of the laser processing machine of FIG. 2, laser beam 108 fed from gas laser oscillator apparatus 100 is reflected off reflection mirror 115 and guided to the periphery of work 116. Laser beam 108 is collected into high-density energy beam by collection lens 118 disposed inside torch 117. Irradiated by the energy beam, work 116 undergoes cut processing. Work 116 is fixed on work table 119. At least any one of X-axis motor 120 and Y-axis motor 121 allows torch 117 to have relative movement to work 116 so as to process work 116 into an intended shape.

INDUSTRIAL APPLICABILITY

The structure of the present invention prevents the back flow of oil mist as the pending problem when a rotary pump is used. This enhances stability of laser cutting and suppresses electric power consumption. The present invention provides a highly eco-friendly laser oscillator apparatus and a laser gas replacement method used for the apparatus. It is therefore useful for a laser processing machine.

What is claimed is:

1. A gas laser oscillator apparatus comprising:
    laser gas sealed in a vacuum chamber under a decompressed condition lower than atmospheric pressure;
    a discharge section for exciting the laser gas;
    a blower section for blowing the laser gas;
    a laser-gas flow passage formed as a circulation passage between the discharge section and the blower section; and
    a gas decompression section for discharging a predetermined amount of the laser gas from the laser-gas flow passage,
    wherein, the gas decompression section discharges, with suction, the laser gas from the laser-gas flow passage on application of Bernoulli's principle, and the gas decompression section uses a part of pressurized gas used in a laser processing machine or the gas laser oscillator apparatus and decreases a ratio of air mixed into the laser gas below a predetermined level.

2. The gas laser oscillator apparatus according to claim 1, wherein the pressurized gas is dry air guided into a housing.

3. The gas laser oscillator apparatus according to claim 1, wherein the pressurized gas contains at least any one of nitrogen, oxygen, and air used as assist gas for laser processing.

4. The gas laser oscillator apparatus according to claim 1, wherein discharging the laser gas from the laser-gas flow passage and refilling the passage with the laser gas are repeated a predetermined number of times.

5. The gas laser oscillator apparatus according to claim 2, wherein discharging the laser gas from the laser-gas flow passage and refilling the passage with the laser gas are repeated a predetermined number of times.

6. The gas laser oscillator apparatus according to claim 3, wherein discharging the laser gas from the laser-gas flow passage and refilling the passage with the laser gas are repeated a predetermined number of times.

7. A laser gas replacement method used for a gas laser oscillator apparatus, the gas laser oscillator apparatus comprising:
    laser gas sealed in a vacuum chamber under a decompressed condition lower than atmospheric pressure;
    a discharge section for exciting the laser gas;
    a blower section for blowing the laser gas;
    a laser-gas flow passage formed as a circulation passage between the discharge section and the blower section; and
    a gas decompression section for discharging a predetermined amount of the laser gas from the laser-gas flow passage,
    the laser gas replacement method comprising:
        discharging, with suction, a predetermined amount of the laser gas from the laser-gas flow passage on application of Bernoulli's principle by the gas decompression section; and
        decreasing a ratio of air mixed into the laser gas below a predetermined level by the gas decompression section with use of a part of pressurized gas used in a laser processing machine or the gas laser oscillator apparatus.

8. The laser gas replacement method according to claim 7, wherein the pressurized gas is dry air guided into a housing.

9. The laser gas replacement method according to claim 7, wherein the pressurized gas contains at least any one of nitrogen, oxygen, and air used as assist gas for laser processing.

10. The laser gas replacement method according to claim 7, wherein discharging the laser gas from the laser-gas flow passage and refilling the passage with the laser gas are repeated a predetermined number of times.

11. The laser gas replacement method according to claim 8, wherein discharging the laser gas from the laser-gas flow passage and refilling the passage with the laser gas are repeated a predetermined number of times.

12. The laser gas replacement method according to claim 9, wherein discharging the laser gas from the laser-gas flow passage and refilling the passage with the laser gas are repeated a predetermined number of times.

* * * * *